(12) United States Patent
Yamanaka et al.

(10) Patent No.: US 7,115,165 B2
(45) Date of Patent: Oct. 3, 2006

(54) SINGLE CRYSTAL OF NITRIDE CONTAINING METAL ELEMENT OF GROUP III OR IV AND METHOD FOR PREPARING THE SAME

(75) Inventors: Shoji Yamanaka, Hiroshima (JP); Xuean Chen, Hiroshima (JP)

(73) Assignee: Japan Science and Technology Corporation, Saitama (JP)

( * ) Notice: Subject to any disclaimer, the term of this patent is extended or adjusted under 35 U.S.C. 154(b) by 275 days.

(21) Appl. No.: 10/398,219

(22) PCT Filed: Oct. 11, 2001

(86) PCT No.: PCT/JP01/08925

§ 371 (c)(1), (2), (4) Date: Apr. 9, 2003

(87) PCT Pub. No.: WO02/34972

PCT Pub. Date: May 2, 2002

(65) Prior Publication Data

US 2004/0040490 A1   Mar. 4, 2004

(30) Foreign Application Priority Data

Oct. 13, 2000   (JP) .............................. 2000-313480

(51) Int. Cl.
*C30B 9/02*   (2006.01)
(52) U.S. Cl. .............. 117/74; 117/75; 117/71; 117/79; 117/952; 117/940
(58) Field of Classification Search .......... 117/71, 117/74, 75, 79, 952, 940
See application file for complete search history.

(56) References Cited

FOREIGN PATENT DOCUMENTS

JP   2001-72499   3/2001

OTHER PUBLICATIONS

Vlassov et al., "Chemical Transport Synthesis, Electrochemical Behavior and Electroic Structure of Superconducting Zirconium and Hafnium Nitride Halides", Inorganic Chemistry, 1999, vol. 38 pp. 4530-4538.*

(Continued)

*Primary Examiner*—Robert Kunemund
(74) *Attorney, Agent, or Firm*—Armstrong, Kratz, Quintos, Hanson & Brooks, LLP

(57) ABSTRACT

β-ZrNCl polycrystalline powder prepared by chemical transport method and $NH_4Cl$ are mixed in a molar ratio of 1:2. The mixture is encapsulated in a Au capsule (6 mm in inner diameter and 6 mm in depth) of a reaction vessel 2, which is then enclosed in a highly heat-conductivitive sodium chloride block as an electrically insulating pressure medium 6. The mixture held in the sodium chloride block is placed in a carbon tube 8 for serving as a heater. In a cubic-pressing apparatus using a pyrophyllite 12 as a pressure-transmitting medium, the mixture is heated at 900° C. for 2 hours under an applied pressure of 3 GPa. After the mixture is allowed to stand until it is cooled down to room temperature, the Au capsule is taken out and light green β-ZrNCl single crystals are obtained. A large single crystal among them had a hexagonal plate-like habit and is transparent with dimensions about 2 mm in diameter, and 0.3 mm in thickness.

9 Claims, 1 Drawing Sheet

OTHER PUBLICATIONS

Fogg et al., "Crystal Structure of MNX ( M=Zr, Hf; X=Cl, Br)" Chemical Communications 1998 pp. 2269-2270.*

Shoji Yamanaka et al.; Inorganic Chemistry, vol. 39, No. 4, pp. 806-809. Feb. 21, 2000. Cited in the int'l. search report.

T. Ishii et al.; Journal of Crystal Growth, vol. 61, No. 3, pp. 689-690, Apr./May 1983. Cited in the int'l. search report.

Mr. Ohashi et al., Journal of Solid State Chemistry 77, 342-347 (1988), "Chemical Vapor Transport of Layer Structured Crystal β-ZrNCl".

Mr. Ohashi et al., Journal of Solid State Chemistry 75, 99-104 (1988), "Novel Synthesis of the Layer Structured β-ZrNCI by the Direct Reactions of Zirconium Metal or Zirconium Hydride with Ammonium Chloride."

* cited by examiner

27;
SINGLE CRYSTAL OF NITRIDE CONTAINING METAL ELEMENT OF GROUP III OR IV AND METHOD FOR PREPARING THE SAME

TECHNICAL FIELD

The present invention relates to nitride production, specifically nitride single crystals, which can be useful as superconducting materials, semiconducting materials, optoelectronic materials, ultrahard ceramic materials, or solid lubricants, and to methods for preparing the same.

BACKGROUND OF ART

Some Group III or IV metal-containing nitrides such as GaN, AlN, TiN, HfN, $Si_3N_4$, and BN can be useful as superconducting materials, semiconducting materials, optoelectronic materials, ultrahard ceramic materials, or solid lubricants, and have widely been used as industrial materials.

These nitrides are prepared as powder materials by direct nitrization of metals or by pyrolysis of precursor compounds. Most of such nitrides are therefore formed into sintered products for use in a variety of industrial materials. Recently, the nitrides have also been prepared as thin films or oriented films close to single crystal by chemical vapor deposition or physical vapor deposition such as sputtering in order to perform their useful functions as optoelectronic materials or coating materials.

Many of the Group IV metal-containing nitrides form specific layer structured crystals, which are used as solid lubricants and useful intermediates for ZrN or HfN nitride ceramics.

The Group IV metal-containing nitrides also include ternary transition metal nitride halides having a chemical composition represented by the formula: MNX (M=Zr, Hf, X=Cl, Br, I). Such metal nitride halides are known to have two polymorphic forms called α and β forms.

The α form has the FeOCl-type layer structure, and the β form has a SmSI-type layer structure. In particular, the β form of the MNX is an important nitride, because it becomes a superconductor with a relatively high critical temperature (Tc) when alkali metal is intercalated (inserted) between its crystal layers, and electrons are doped into its nitride layer. For example, β-ZrNCl and β-HfNCl intercalated with lithium become superconductors with Tcs of about 14 K and 25.5 K, respectively, which have been noted as new high-Tc superconductors.

Ohashi et al. have succeeded in synthesizing β-ZrNCl powder in high yield by the reaction of metallic zirconium or zirconium hydride with ammonium chloride vapor at high temperature (J. Solid State Chem., 75, 99 (1988)).

Ohashi et al. have also succeeded in obtaining a well crystallized sample by a chemical transport of the as prepared powder sample in a vacuum-sealed quartz tube (J. Solid State Chem., 77, 342 (1988)). In the chemical transport method, a small amount of ammonium halide such as ammonium chloride as a transporting agent is added into the quartz tube for the chemical transportation of β-MNX.

Ohashi et al. have provided a breakthrough for the β-MNX research by developing such a chemical transport method for purification and crystallization of β-MNX layer structured crystal. However, such a method can only produce thin plate-shaped polycrystalline samples.

Yamanaka et al. have succeeded in synthesizing the β-form crystal phase of all the compositions of the MNX (M=Zr, Hf, X=Cl, Br, I) and reported that all the compositions can show superconductivity by intercalation of alkali metal (Inorg. Chem., 39, 806 (2000)). In the reported process, the α-form powder sample was converted into the β-form by compressing it under a high pressure of 1 to 5 GPa. However, the resulting crystal was not a single crystal but a polycrystalline powder.

The β-MNX layer structured nitrides are semiconductors with a wide band gap, which are not only potential host materials for superconductors but also potential optoelectronic materials.

The Group III or IV metal-containing nitrides are potential materials for semiconductors, optoelectronics, or superconductors. Such nitrides are, however, mostly prepared as powder materials; even the chemical transport method can only provide very thin and soft polycrystals. These nitrides should be prepared as well developed single crystals in order for practical use as industrial materials. However, the production of such single crystals has been considered to be very difficult, and no method has been reported on such production yet.

It is therefore an object of the present invention to provide such nitride single crystals and the methods for preparing the same.

DISCLOSURE OF INVENTION

In an aspect, the present invention is directed to a nitride single crystal itself which includes a Group III or IV metal element such as B, Al, Ga, In, Sc, Y, La, Si, Ge, Ti, Zr, and Hf.

In a preferred manner, the nitride single crystal is a layer structured nitride having a chemical composition represented by the formula: MNX (M=Zr, Hf, X=Cl, Br, I), and having the β-form layer structure.

In another aspect, the present invention is directed to present a method to prepare nitride single crystals, which includes heating the constituent metal of the corresponding metal nitride, or a compound containing the constituent metal of the metal nitride with ammonium halide under conditions of a pressure of 0.01 GPa or higher and a temperature of 400° C. or higher.

In the process of the present invention, under the condition of a temperature of 400° C. or higher, the ammonium halide is decomposed into ammonia and hydrogen halide, which react with the coexisting metal or metal compounds to grow nitride single crystals. A high pressure is generated as the ammonium halide is decomposed. Therefore, the process needs a high pressure to encapsulate the decomposition products and the nitrides at high temperatures.

According to the present invention, Group III or IV metal-containing metal nitride single crystals, specifically β-MNX layer structured nitride single crystals are produced, which can be useful as superconducting materials, semiconducting materials, optoelectronic materials, ultrahard ceramic materials, or solid lubricants.

According to the process of the present invention, such nitride single crystals are prepared by allowing a metal that is a component of the nitride to be prepared or a compound containing the constituent metal of the nitrides to react with ammonium halide under conditions of a pressure of 0.01 GPa or higher and a temperature of 400° C. or higher.

BEST MODE FOR CARRYING OUT THE INVENTION

Figure 1:
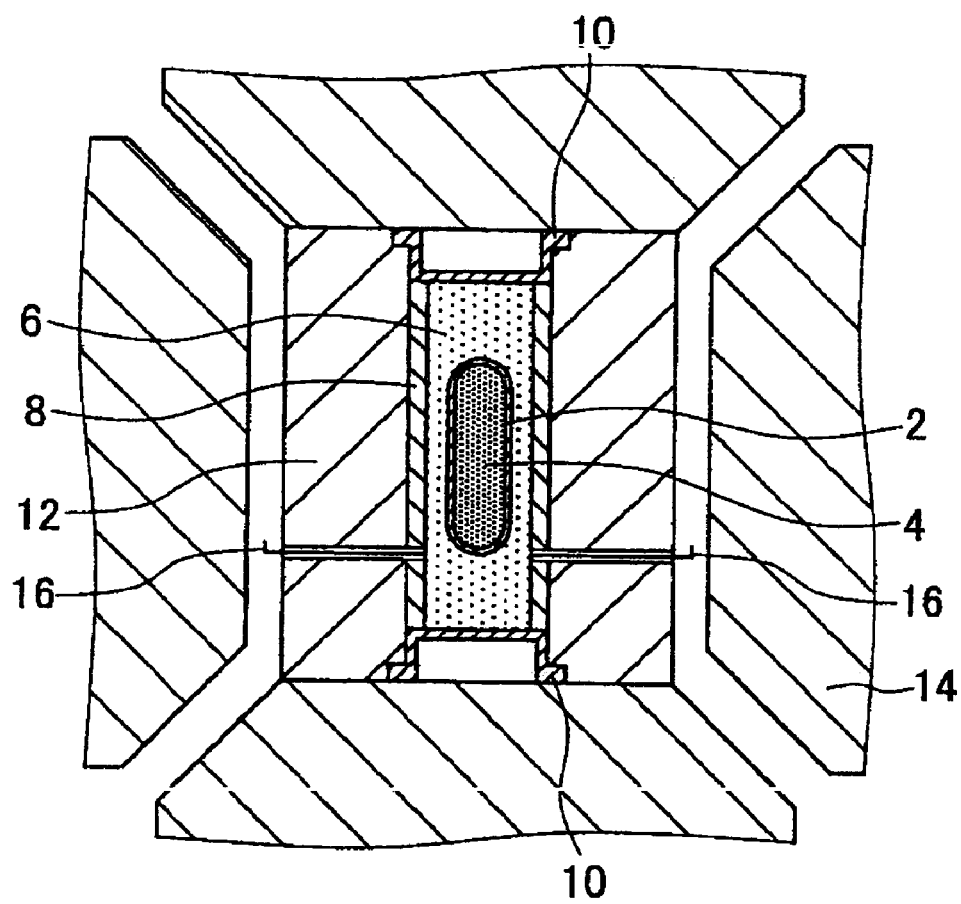
FIG. 1 is a cross-sectional front view showing a main unit of a cubic pressing apparatus used in Examples.

It is necessary to set a temperature at which the ammonium halide can be decomposed. In such a temperature range for decomposition, a higher temperature can increase the reaction rate and therefore is preferred. However, from the consideration of the withstanding pressure of the reaction apparatus, the appropriate temperature range used should be below about 1500° C.

It is necessary to set a pressure under which the decomposition products of ammonium halide can be held or encapsulated together with the nitride or the starting materials thereof, and a desired form of crystals of the nitride can selectively be grown. For example, the β-form of the MNX layer structured single crystals can selectively be grown by the application of a pressure of 0.01 GPa or higher, although the nitride represented by the formula MNX has two polymorphic forms, namely α- and β-forms. The pressure has no upper limit but is appropriately up to about 10 GPa in consideration of the pressure available and the withstanding pressure of the reaction apparatus.

Examples of the metal or the metal compound used as a starting materials include Groups III and IV metal elements such as B, Al, Ga, In, Sc, Y, La, Si, Ge, Ti, Zr, and Hf or hydrides, nitrides, halides, or nitride halides of these metals. Examples of the metal nitride halides include TiNCl, ZrNCl, and HfNCl.

Examples of the ammonium halides allowed to coexist include $NH_4F$, $NH_4Cl$, $NH_4Br$, $NH_4I$, and any combination thereof.

Different types of high pressure-generating apparatuses can be used to provide the reactants a desired temperature and a desired pressure, such as a cubic-pressing apparatus as used in the examples below, piston-cylinder type, and belt type pressure-generating apparatuses.

Desired materials for the reaction vessel include h-BN (hexagonal boron nitride), Au (gold), Pt (platinum), Ta (tantalum), Mo (molybdenum), W (tungsten), and Nb (niobium). A pressure of 0.01 GPa or so can be achieved in a Ta or Nb tube that is heat-sealed and heated in an inert atmosphere. A hot isostatic press (HIP) apparatus may also be used, in which a glass tube is sealed and a gas such as argon is used.

The present invention is more specifically described by showing examples and comparative examples in the followings, but such examples are not intended to limit the scope of the invention.

First, a cubic-pressing apparatus used in the examples is described by referring to FIG. 1.

Reference numeral 2 represents a reaction vessel used in the shape of a capsule, in which a sample 4 including nitride, metal, and ammonium halide as a flux is encapsulated. The reaction vessel 2 is enclosed in an electrically insulating pressure medium 6 such as NaCl and h-BN and placed in a carbon tube 8 that serves as a heater. The carbon tube 8 is contacted with copper caps 10 at both ends, through which an electric current is applied to the carbon tube 8. On the side of the carbon tube 8 and the copper caps 10, a pyrophyllite 12 is provided to serve as a pressure-transmitting medium. In such a state, a pressing anvil 14 made of a refractory metal such as tungsten carbide is provided on each of the six sides including upper and lower sides and four lateral sides. Reference numeral 16 represent a thermocouple for measuring the temperature, which is placed in the pressure medium 6 to detect the sample temperature via the pressure medium 6. The pressing anvil 14 provided on each of the upper and lower sides is in contact with each copper cap 10 and transmit an electric current to the carbon tube 8.

The pressing anvils 14 on the six sides, which are not in contact with each other, each equally press the sample 4, which is placed at the center, through the pyrophyllite 12 and the copper caps 10 from the outer side to the center.

EXAMPLE 1

Preparation of β-ZrNCl Single Crystals (First Mode)

β-ZrNCl polycrystalline powder prepared by chemical transport method and $NH_4Cl$ were mixed in a molar ratio of 1:2. The mixture was encapsulated in a Au capsule (6 mm in inner diameter and 6 mm in depth) of the reaction vessel 2, which was then enclosed in a highly thermal conductive sodium chloride block as an electrically insulating pressure medium 6. The mixture held in the sodium chloride block was placed in the carbon tube 8 for serving as a heater. In the cubic-pressing apparatus as shown in FIG. 1 using the pyrophyllite 12 as the pressure-transmitting medium, the mixture was heated at a temperature of 900° C. for 2 hours under an applied pressure of 3 GPa. According to the temperature program for this process, the mixture was gradually heated to 900° C. and then held at this temperature for 1 hour, and then cooled down to 500° C. at a rate of 67° C./h and allowed to stand until it was cooled to room temperature.

After the cooling to room temperature, the Au capsule was taken out and pale green β-ZrNCl single crystals were obtained. The yield was about 40%. A large single crystal among them showed a hexagonal plate-like habit reflecting the crystal structure and was transparent. The dimensions were about 2 mm in diameter, and 0.3 mm in thickness.

In this example, another reaction was carried out under the same conditions, except that the molar ratio of the β-ZrNCl polycrystalline powder to the $NH_4Cl$ was 1:3.5. Similarly, pale green β-ZrNCl single crystals were obtained.

EXAMPLE 2

Preparation of β-ZrNCl Single Crystals (Second Mode)

ZrN and $NH_4Cl$ were mixed in a molar ratio of 1:2. The mixture was encapsulated in a Au capsule (6 mm in inner diameter and 6 mm in depth) as the reaction vessel 2 and treated under the same conditions as Example 1.

After the cooling to room temperature, the Au capsule was taken out and pale green β-ZrNCl single crystals were obtained. The yield was about 40%. A large single crystal among them showed a hexagonal plate-like habit reflecting the crystal structure and was transparent. The dimensions were about 2 mm in diameter, and 0.3 mm in thickness.

EXAMPLE 3

Preparation of β-HfNCl Single Crystals

β-HfNCl polycrystalline powder prepared by chemical transport method and $NH_4Cl$ were mixed in a molar ratio of 1:2.1. The mixture was encapsulated in a Pt capsule (0.1 mm in thickness, 6 mm in inner diameter, and 6 mm in depth) as the reaction vessel 2, which was then enclosed in a high heat-resistance h-BN block as the electrically insulating pressure medium 6.

In the same manner as Example 1, the block was placed in the carbon tube 8 for serving as a heater. In the cubic-pressing apparatus as shown in FIG. 1 using the pyrophyllite

12 as the pressure-transmitting medium, the mixture was heated at a temperature of 1200° C. for 2 hours under an applied pressure of 3 GPa.

The mixture was then cooled down to 900° C. at a rate of 100° C./h and allowed to stand until it was cooled to room temperature. The Pt capsule was taken out and colorless transparent β-HfNCl single crystals were obtained. The yield was about 30%. A large single crystal among them had a hexagonal plate-like habit with dimensions of about 3 mm in diameter and 0.3 mm in thickness.

EXAMPLE 4

Preparation of β-ZrNBr Single Crystals

ZrN (0.060 g) and $NH_4Br$ (0.180 g) were mixed in a molar ratio of 1:3.2. The mixture was encapsulated in a Pt capsule (0.1 mm in thickness, 6 mm in inner diameter, and 4 mm in depth) as the reaction vessel 2, which was then enclosed in a high heat-resistance h-BN block as the electrically insulating pressure medium 6.

In the same manner as Example 1, the block was placed in the carbon tube 8 for serving as a heater. In the cubic-pressing apparatus as shown in FIG. 1 using the pyrophyllite 12 as the pressure-transmitting medium, the mixture was heated at a temperature of 1100° C. for 1 hour under an applied pressure of 3 GPa. According to the temperature profile, the mixture was heated to 1100° C. at a heat-up rate of 48° C./min and held at 1100° C. for 1 hour, and then cooled down to 800° C. at a cooling rate of 100° C./h.

After the mixture was allowed to stand under the increased pressure until it was cooled to room temperature, the Pt capsule was taken out and dark green β-ZrNBr single crystals were obtained. The yield was about 30%. The single crystals had a hexagonal plate-like habit with dimensions of diameters of 0.1 to 1.0 mm and thicknesses of several hundred m.

As a result of the investigation for optimum reaction conditions, the starting material composition ratio of ZrN:$NH_4Br$ (molar ratio) was determined to be preferably from 1:2 to 1:5, more preferably 1:3.2, and the reaction temperature was preferably from 950 to 1200° C., more preferably 1100° C. The conditions of the ZrN:$NH_4Br$ mixing ratios higher than 1:2 with ZrN in excess and reaction temperatures lower than 950° C. provided almost homogeneous β-ZrNBr powder. On the other hand, the conditions of the mixing ZrN:$NH_4Br$ ratios lower than 1:5 with NH4Br in excess and reaction temperatures higher than 1200° C. provided a lower yield of the β-ZrNBr single crystal.

EXAMPLE 5

Preparation of β-ZrNI Single Crystals

ZrN (0.050 g) and $NH_4I$ (0.200 g) were mixed in a molar ratio of 1:2.9. The mixture was encapsulated in a Au capsule (0.1 mm in thickness, 6 mm in inner diameter, and 4 mm in depth) as the reaction vessel 2, which was then enclosed in a high heat-resistance h-BN block as the electrically insulating pressure medium 6.

In the same manner as Example 1, the block was placed in the carbon tube 8 for serving as a heater. In the cubic-pressing apparatus as shown in FIG. 1 using the pyrophyllite 12 as the pressure-transmitting medium, the mixture was heated at a temperature of 1000° C. for 1.5 hours under an applied pressure of 3 GPa and then cooled down to 850° C. at a cooling rate of 100° C./h and allowed to stand until it was cooled to room temperature.

The Au capsule was taken out and brown transparent 62-ZrNI single crystals were obtained. The yield was about 40%.

In this example, the conditions of the same starting material composition and a reaction temperature of 950° C. under pressures higher than 5 GPa gave similar results, but under pressures lower than 1.5 GPa gave α-ZrNI. The α-ZrNI can be converted into β-ZrNI by the high-pressure and high-temperature process as shown in this example.

EXAMPLE 6

Preparation of β-HfNBr Single Crystals

First, $NH_4Br$ was allowed to react with Hf metal powder at 650° C. to form α-HfNBr powder. The resulting powder was purified by a chemical transport method in the temperature gradient of 750° C. to 850° C.

The α-HfNBr powder prepared by the chemical transport method and $NH_4Br$ were mixed in a molar ratio of 1:2.3. The mixture was encapsulated in a Pt capsule (0.1 mm in thickness, 6 mm in inner diameter, and 4 mm in depth) of the reaction vessel 2, which was then enclosed in a high heat-resistance h-BN block as the electrically insulating pressure medium 6.

In the same manner as Example 1, the block was placed in the carbon tube 8 for serving as a heater. In the cubic-pressing apparatus as shown in FIG. 1 using the pyrophyllite 12 as the pressure-transmitting medium, the mixture was heated at a reaction temperature of 1100° C. for 1 hour under an applied pressure of 3 GPa.

After the mixture was allowed to stand until it was cooled down to room temperature, the Pt capsule was taken out and pale yellow-green β-HfNBr single crystals were obtained. The yield was about 30%.

In the process for the β-HfNBr single crystals, the reaction temperature is preferably maintained at 1100° C. in order to form a large single crystal. At a reaction temperature lower than 950° C., no crystal larger than 0.1 mm was obtained. At a reaction temperature higher than 1200° C., the β-HfNBr was decomposed into an amorphous phase even under a pressure higher than 3 GPa.

EXAMPLE 7

Preparation of β-HfNI Single Crystals

β-HfNI Single Crystals were obtained using the process of Example 6, except that the applied pressure was 5 GPa, and the reaction temperature was 1050° C. This reaction also provided a yield of about 30%.

Table 1 shows a summary of the synthesis conditions in the above examples. Tables 2 and 3 show crystallographic parameters determined by using the single crystals obtained in the examples on a four-circle X-ray diffractometer.

TABLE 1

Synthesis Conditions of β-MNX (M = Zr, Hf; X = Cl, Br, I) Single Crystals

| Single crystals | Starting materials (molar ratio) | Temperature ° C. | Pressure GPa | Color |
|---|---|---|---|---|
| β-ZrNCl | βZrNCl/$NH_4Cl$ (1:3.5) | 900 | 3 | Pale yellow-green |
| β-ZrNBr | ZrN/$NH_4Br$ (1:3.2) | 1100 | 3 | Dark green |

TABLE 1-continued

Synthesis Conditions of β-MNX (M = Zr, Hf; X = Cl, Br, I) Single Crystals

| Single crystals | Starting materials (molar ratio) | Temperature °C. | Pressure GPa | Color |
|---|---|---|---|---|
| βZrNI | ZrN/NH$_4$I (1:2.9) | 1000 | 3 | Brown |
| β-HfNCl | β-HfNCl/NH$_4$Cl (1:2.1) | 1200 | 3 | Colorless |
| β-HfNBr | α-HfNBr/NH$_4$Br (1:2.3) | 1100 | 3 | Light yellow-green |
| β-HfNI | αHfNI/NH$_4$I (1:2.3) | 1050 | 5 | Brown |

TABLE 2

Crystallographic Data for β-MNX (M = Zr; Hf; X = Br, I)

| Formula | ZrNCl | ZrNBr | ZrNI |
|---|---|---|---|
| Crystal size, mm | 0.20 × 0.10 × 0.03 | 0.26 × 0.16 × 0.04 | 0.30 × 0.30 × 0.02 |
| Space group | R-3m (No.166) | R-3m (No.166) | R-3m (No.166) |
| a, Å | 3.6046(4) | 3.6403(6) | 3.718(2) |
| c, Å | 27.672(4) | 29.270(5) | 31.381(9) |
| V, Å$^3$, Z | 311.38(7), 6 | 335.9(1), 6 | 375.7(3), 6 |
| d$_{calc}$, g/cm$^3$ | 4.501 | 5.491 | 6.156 |
| 2θ$_{max}$, deg | 100 | 100 | 100 |
| Total reflections | 2085 | 1848 | 2108 |
| Unique reflection | 473 | 401 | 454 |
| Observed [I ≧ 2σ(I)] | 447 | 337 | 418 |
| No. of variables | 11 | 10 | 11 |
| GOF[1] on F$_o^2$ | 1.143 | 1.147 | 1.171 |
| R indices [I ≧ 2σ(I)] | | | |
| R1[b] | 0.0270 | 0.0540 | 0.0603 |
| wR2[c] | 0.0751 | 0.1552 | 0.1885 |
| R indices (all data) | | | |
| R1 | 0.0291 | 0.0647 | 0.0630 |
| wR2 | 0.0760 | 0.1602 | 0.1904 |

| Formula | HfNCl | HfNBr | HfNI |
|---|---|---|---|
| Crystal size, mm | 0.14 × 0.12 × 0.03 | 0.18 × 0.10 × 0.03 | 0.06 × 0.06 × 0.02 |
| Space group | R-3m(No.166) | R-3m(No.166) | R-3m(No.166) |
| a, Å | 3.5767(8) | 3.610(1) | 3.689(1) |
| c, Å | 27.711(7) | 29.294(6) | 31.329(6) |
| V, Å$^3$, Z | 307.01(12), 6 | 330.6(2), 6 | 369.2(2), 6 |
| d$_{calc}$, g/cm$^3$ | 7.398 | 8.209 | 8.619 |
| 2θ$_{max}$, deg | 100 | 100 | 50.6 |
| Total reflections | 2143 | 1520 | 574 |
| Unique reflection | 471 | 506 | 116 |
| Observed [I ≧ 2σ(I)] | 454 | 412 | 113 |
| No. of variables | 11 | 11 | 11 |
| GOF[a] on F$_o^2$ | 1.153 | 1.103 | 1.274 |
| R indices [I ≧ 2σ(I)] | 0.0372 | 0.0653 | 0.0544 |
| | 0.0979 | 0.1464 | 0.1583 |
| R indices (all data) | 0.0391 | 0.0851 | 0.0556 |
| | 0.0991 | 0.1549 | 0.1593 |

$$^a GOF = \sqrt{\frac{\sum[w(F_o^2 - F_c^2)^2]}{n - p}},$$

$$^b R1 = \frac{\sum\|F_o| - |F_c\|}{\sum|F_o|},$$

TABLE 2-continued

Crystallographic Data for β-MNX (M = Zr; Hf; X = Br, I)

$$^c wR2 = \sqrt{\frac{\sum [w(F_o^2 - F_c^2)^2]}{\sum w(F_o^2)^2}}$$

In the table, each number in parentheses indicates a standard deviation determined by the refinements.

TABLE 3

Atomic Coordinates Temperature Factors for β-MNX (M = Zr, Hf; X = Cl, Br, I)

| Atoms | x | y | z | $U_{11} = U_{22}$ | $U_{33}$ | $U_{23} = U_{13}$ | $U_{12}$ | $U_{eq}$ |
|---|---|---|---|---|---|---|---|---|
| ZrNCl* | | | | | | | | |
| Zr | 0 | 0 | 0.11924 (1) | 0.0106 (1) | 0.0108 (1) | 0 | 0.0053 (1) | 0.0107 (1) |
| Cl | 0 | 0 | 0.38780 (3) | 0.0164 (2) | 0.0124 (2) | 0 | 0.0082 (1) | 0.0151 (1) |
| N | 0 | 0 | 0.19771 (8) | 0.0130 (4) | 0.0108 (6) | 0 | 0.0065 (2) | 0.0123 (3) |
| ZrNBr | | | | | | | | |
| Zr | 0 | 0 | 0.12217 (3) | 0.0048 (2) | 0.0058 (3) | 0 | 0.0024 (1) | 0.0051 (2) |
| Br | 0 | 0 | 0.38836 (3) | 0.0097 (3) | 0.0084 (3) | 0 | 0.0048 (1) | 0.0093 (2) |
| N | 0 | 0 | 0.1963 (2) | 0.006 (1) | 0.006 (2) | 0 | 0.0032 (6) | 0.0062 (9) |
| ZrNI | | | | | | | | |
| Zr | 0 | 0 | 0.20740 (4) | 0.0053 (3) | 0.0072 (4) | 0 | 0.0027 (1) | 0.0060 (2) |
| I | 0 | 0 | 0.38952 (2) | 0.0089 (2) | 0.0090 (3) | 0 | 0.0045 (1) | 0.0090 (2) |
| N | 0 | 0 | 0.1393 (3) | 0.005 (2) | 0.007 (2) | 0 | 0.0026 (8) | 0.006 (1) |
| HfNCl* | | | | | | | | |
| Hf | 0 | 0 | 0.11950 (1) | 0.0089 (1) | 0.0090 (1) | 0 | 0.0044 (1) | 0.0089 (1) |
| Cl | 0 | 0 | 0.38795 (8) | 0.0127 (5) | 0.0111 (5) | 0 | 0.0064 (2) | 0.0122 (3) |
| N | 0 | 0 | 0.1976 (2) | 0.014 (2) | 0.008 (2) | 0 | 0.0067 (8) | 0.012 (1) |
| HfNBr | | | | | | | | |
| Hf | 0 | 0 | 0.21096 (3) | 0.0105 (2) | 0.0110 (3) | 0 | 0.0053 (1) | 0.0107 (2) |
| Br | 0 | 0 | 0.38850 (7) | 0.0150 (4) | 0.0132 (7) | 0 | 0.0075 (2) | 0.0144 (3) |
| N | 0 | 0 | 0.1371 (5) | 0.019 (4) | 0.006 (3) | 0 | 0.009 (2) | 0.015 (2) |
| HfNI | | | | | | | | |
| Hf | 0 | 0 | 0.20714 (6) | 0.010 (1) | 0.018 (2) | 0 | 0.0050 (7) | 0.013 (1) |
| I | 0 | 0 | 0.38960 (9) | 0.012 (1) | 0.018 (2) | 0 | 0.0060 (7) | 0.014 (1) |
| N | 0 | 0 | 0.1392 (11) | 0.011 (9) | 0.02 (2) | 0 | 0.005 (4) | 0.014 (6) |

$U_{eq}$ is Isotropic Temperature Factor
$U_{ij}$ is Anisotropic Temperature Factor The structure of HfNCl had been analyzed, and the results were reported by other research groups. However, such results were obtained using polycrystalline samples and therefore were less precise and less reliable.

According to the present invention, the β-MNX (M=Zr, Hf; X=Cl, Br, I) single crystals can be obtained in a size suitable for structural analysis, and the obtained results of the structural analysis are highly reliable and useful for clarification of superconducting mechanisms and other properties.

EXAMPLE 8

Preparation of h-BN Single Crystals

A powdered sample of h-BN was encapsulated in a h-BN capsule (6 mm in inner diameter and 6 mm in depth) as the reaction vessel 2, which was then enclosed in a high heat-resistance h-BN block as the electrically insulating pressure medium 6.

The block was then placed in the carbon tube 8 for serving as a heater. In the cubic-pressing apparatus as shown in FIG. 1 using the pyrophyllite 12 as the pressure-transmitting medium, the sample was heated at a temperature of 1200° C. for 2 hours under an applied pressure of 5 GPa.

After the sample was allowed to stand until it was cooled down to room temperature, the BN capsule was taken out and colorless transparent h-BN single crystals were obtained. The single crystals were about 1 mm in diameter, 0.2 mm in thickness, and in the shape of a regular hexagonal plate.

According to the present invention, all the compositions of the β-MNX (M=Zr, Hf, X=Cl, Br, I) layer structured nitrides can be prepared in the β-form single crystals, and h-BN single crystals can also be prepared.

INDUSTRIAL APPLICABILITY

The resulting nitride single crystals can be used as superconducting materials, semiconducting materials, optoelectronic materials, ultrahard ceramic materials, or solid lubricants.

The invention claimed is:

1. A method for preparing a nitride single crystal, which allows a metal that is a component of the nitride single crystal to be prepared or a compound containing the metal to coexist with ammonium halide under the conditions of a pressure higher than or equal to 0.01 GPa and a temperature higher than or equal to 400° C., the amount of ammonium halide being more than the metal in molar ratio, and the pressure being set so that decomposition products of ammonium halide at said temperature can be held or encapsulated together with the nitride or starting materials thereof to grow β-form single crystals of the nitride.

2. The method for preparing a nitride single crystal according to claim 1, wherein the nitride single crystal to be prepared comprises a metal element of Group III or IV.

3. The method for preparing a nitride single crystal according to claim 1 or 2, wherein the nitride single crystal to be prepared has a chemical composition represented by the formula: MNX, wherein M=Zr, Hf; N is nitrogen; and X=Cl, Br, I.

4. The method for preparing a nitride single crystal according to claim 3, wherein the metal compound allowed to coexist with the ammonium halide is represented by MN.

5. The method for preparing a nitride single crystal according to claim 4, wherein the method uses a starting material composition with a molar $MN:NH_4X$ ratio of 1:2 to 1:5 and a reaction temperature of 850° C. to 1300° C.

6. The method for preparing a nitride single crystal according to claim 5, wherein the nitride single crystal to be prepared is ZrNBr and the reaction temperature is from 950 to 1200° C.

7. The method for preparing a nitride single crystal according to claim 3, wherein the metal compound allowed to coexist with the ammonium halide is MNX powder.

8. The method for preparing a nitride single crystal according to claim 7, wherein the method uses a starting material composition with a molar $MNX:NH_4X$ ratio of 1:2 to 1:5 and a reaction temperature of 850° C. to 1300° C.

9. The method for preparing a nitride single crystal according to claim 8, wherein the nitride single crystal to be prepared is HfNBr and the reaction temperature is from 950 to 1200° C.

* * * * *